(12) United States Patent
Ståhlberg et al.

(10) Patent No.: US 8,726,387 B2
(45) Date of Patent: May 13, 2014

(54) DETECTING A TROJAN HORSE

(75) Inventors: Mika Ståhlberg, Espoo (FI); Jarno Niemelä, Espoo (FI); Kimmo Kasslin, Espoo (FI)

(73) Assignee: F-Secure Corporation, Helsinki (FI)

( * ) Notice: Subject to any disclaimer, the term of this patent is extended or adjusted under 35 U.S.C. 154(b) by 194 days.

(21) Appl. No.: 12/931,855

(22) Filed: Feb. 11, 2011

(65) Prior Publication Data
US 2012/0210431 A1    Aug. 16, 2012

(51) Int. Cl.
*H04L 29/06*    (2006.01)

(52) U.S. Cl.
USPC .............. 726/24; 713/2; 713/170; 713/175; 709/206; 709/224; 709/225; 705/50; 705/64

(58) Field of Classification Search
CPC .................... H04L 63/145; H04L 63/1416
USPC ....................................... 726/23, 24
See application file for complete search history.

(56) References Cited

U.S. PATENT DOCUMENTS

| | | | |
|---|---|---|---|
| 6,092,194 A | 7/2000 | Touboul ........................ 713/200 |
| 7,007,159 B2 * | 2/2006 | Wyatt .............................. 713/1 |
| 8,364,811 B1 * | 1/2013 | Erdmann et al. .............. 709/224 |
| 8,473,461 B1 * | 6/2013 | Woirhaye et al. ............. 707/640 |
| 8,495,037 B1 * | 7/2013 | Westenberg ................... 707/698 |
| 8,595,840 B1 * | 11/2013 | Malibiran et al. ............... 726/24 |
| 2003/0159070 A1 * | 8/2003 | Mayer et al. .................. 713/201 |
| 2004/0039921 A1 * | 2/2004 | Chuang ......................... 713/187 |
| 2004/0093506 A1 * | 5/2004 | Grawrock et al. ............ 713/189 |
| 2007/0016953 A1 * | 1/2007 | Morris et al. .................... 726/24 |
| 2007/0143432 A1 * | 6/2007 | Klos et al. ..................... 709/206 |
| 2007/0180509 A1 * | 8/2007 | Swartz et al. ..................... 726/9 |
| 2008/0040804 A1 * | 2/2008 | Oliver et al. ..................... 726/25 |
| 2008/0256187 A1 * | 10/2008 | Kay .............................. 709/206 |
| 2009/0077383 A1 * | 3/2009 | de Monseignat et al. ..... 713/175 |
| 2009/0320131 A1 * | 12/2009 | Huang ............................ 726/23 |
| 2010/0058472 A1 * | 3/2010 | Dotan ............................. 726/22 |
| 2010/0287246 A1 * | 11/2010 | Klos et al. ..................... 709/206 |
| 2011/0219451 A1 * | 9/2011 | McDougal et al. ............. 726/23 |
| 2012/0233656 A1 * | 9/2012 | Rieschick et al. ................ 726/1 |

FOREIGN PATENT DOCUMENTS

WO    WO 2009149516 A1 * 12/2009

OTHER PUBLICATIONS

Geinimi Trojan Technical Teardown | https://blog.lookout.com/_media/Geinimi_Trojan_Teardown.pdf | Jan. 6, 2011 | Strazzere et al.*
Mobile Phones: The Next Frontier for Hackers? | Neal Leavitt | 2005 | pp. 20-23.*
Leyden, John, "Chinese bot will slurp Droid, Evil "game" can also zombenate victims", Dec. 31, 2010, Geinimi description, 2 pgs.

(Continued)

*Primary Examiner* — Mahfuzur Rahman
(74) *Attorney, Agent, or Firm* — Harrington & Smith

(57) ABSTRACT

A method and apparatus for detecting a Trojan horse in a suspicious version of a software application in the form of at least one electronic file. A computer device determines a source from which the suspicious version of the software application was obtained. A comparison is then made between the source from which the suspicious version of the software application was obtained and a source from which an original, clean version of the software application was obtained. If the sources differ, then it is determined that the suspicious version of the software application is more likely to contain a Trojan horse than if the sources were the same.

18 Claims, 3 Drawing Sheets

(56) References Cited

OTHER PUBLICATIONS

"Security Alert: Geinimi, Sophisticated New Android Trojan Found in Wild", Tim Wyatt, The Lookout Blog, Dec. 29, 2010, 11 pgs.

"Static Detection of Application Backdoors", Chris Wysopal, et al., Datenschutz and Datenscherheit, Mar. 2010, pp. 149-155.

"Static Detection of Application Backdoors", Chris Wysopal et al., BlackHat Briefings USA, Aug. 2007, 58 pgs.

* cited by examiner

DETECTING A TROJAN HORSE

TECHNICAL FIELD

The invention relates to the field of detecting a Trojan horse.

BACKGROUND

Malware infection of computers and computer systems is a growing problem. There have been many high profile examples where computer malware has spread rapidly around the world causing many millions of pounds worth of damage in terms of lost data and lost working time.

Malware is often spread using a computer virus. Early viruses were spread by the copying of infected electronic files onto floppy disks, and the transfer of the electronic file from the disk onto a previously uninfected computer. When the user tries to open the infected electronic file, the malware is triggered and the computer infected. More recently, viruses have been spread via the Internet, for example using e-mail. It is also known for viruses to be spread by the wireless transmission of data, for example by communications between mobile communication devices using a cellular telephone network.

Various anti-virus applications are available on the market today. These tend to work by maintaining a database of signatures or fingerprints for known viruses and malware. With a "real time" scanning application, when a user tries to perform an operation on a file, e.g. open, save, or copy, the request is redirected to the anti-virus application. If the application has no existing record of the electronic file, the electronic file is scanned for known virus or malware signatures. If a virus or malware is identified in a file, the anti-virus application reports this to the user, for example by displaying a message in a pop-up window. The anti-virus application may then add the identity of the infected file to a register of infected files.

In recent years, so called "application stores" have proved to be very popular with mobile users. APPLE App Store and ANDROID Market are perhaps the best known examples. An application store is an online service that allows a user to browse and download software applications from a remote server to their device. Applications are frequently free or very low cost, and a successful application can be downloaded to millions of devices.

While the same software application may be available from another source, the convenience of an application store means that the great majority of downloads of a software application are made using an app store.

With the application store paradigm in place, it is increasingly difficult for distributors of malware to use methods such as spam or Search Engine Optimization (SEO) poisoning to trick their victims to install malicious applications. The most viable attack vector left is to make malware available on an application store. A simple way of tricking users into installing malware is to provide the malware in the form of an application that appears to perform a desirable function for the user. This type of malware is known as a Trojan horse, or Trojan. While the Trojan horse appears to perform a desirable function for the user, it contains malicious code. The malicious code may be executed in addition to performing the desirable function, so the user is not aware that his computer device is running a Trojan horse. A Trojan horse may be used, for example, to display unwanted advertisements or allow a malicious third party to access the computer device and perform unwanted operations such as contacted premium rate numbers, stealing data, installing unwanted software, modifying or removing existing files and so on.

One way of making a Trojan horse is to take an existing application and modify it in order to add malicious functionality. This is sometimes termed "trojanizing" an application. One example of trojanizing is the Geinimi Trojan family that became active on the ANDROID platform at the end of 2010. Geinimi is mobile malware that poses as a gaming application. When a user installs a Geinimi Trojan horse, Geinimi can send personal data from the user's device to a remote server. Furthermore, Geinimi can receive commands from a remote third party.

Trojan horses can be detected by analysing the code of a software application to determine if it includes any malicious functionality, or emulating the software application to ascertain whether it performs any undesirable operations. These approaches can be time consuming and resource intensive.

SUMMARY

It is an object of the present invention to provide a way of detecting that a software application contains a Trojan horse without resorting immediately to detailed analysis of the code or emulation. According to a first aspect, there is provided a method of detected a Trojan in a suspicious software application in the form of at least one electronic file. A computer device determines the source from which the suspicious software application was obtained. A comparison is then made between the source from which the suspicious software application was obtained and a source from which an original, clean version of the software application was obtained. If the sources differ, then it is determined that the suspicious application is likely to contain a Trojan horse.

As an option, the sources comprise an identity of a vendor.

The method optionally further comprises making a comparison between the suspicious version of the software application and the clean version of the software application. The comparison is made between any of the version numbers, version histories, application classes, size of code blocks, imported Application Programming Interfaces, Application Programming Interface functions called, file size of components of the software application, and capabilities and access controls indicating the functions that the application wishes to be able to access.

Optionally, the source from which the original, clean version of the software application was obtained and further metadata relating to the clean version of the software application is stored at a database.

The invention may optionally be implemented using a backend server. In this case, the method optionally comprises sending a message from the computer device to a remote server, the message including any of the suspicious application and metadata relating to the suspicious application such that the server can perform the comparison. In this case, the method may optionally comprise, at the device, receiving a response message from the server. The response message includes an indication that the suspicious software application is likely to contain a Trojan horse.

The method optionally comprises the device sending a message to a remote database, the message including at least an identity of the suspicious software application. The device then receives a response from the remote database, the response including the source from which the original, clean version of the software application was obtained.

According to a second aspect, there is provided a device for use in a communication network. The device is provided with a processor for determining that a software application in the form of at least one electronic file is suspicious. The processor is further arranged to determine the source of the software application, and further arranged to compare the source from which the suspicious software application was obtained with a source from which an original, clean version of the software application was obtained. In the event that the sources differ, the processor determines that the suspicious application is likely to contain a Trojan horse.

As an option, the device further comprises a transmitter for sending to one of a server and a database a request message. The request message includes a request for the source from which the original, clean version of the software application was obtained. A receiver is also provided for receiving a response, the response including the source from which the original, clean version of the software application was obtained. This embodiment allows the device to query a database which provides sufficient information to the device for the device to make the determination.

The processor is optionally further arranged to make a comparison between the suspicious version of the software application and the clean version of the software application of any of the version numbers, version histories, application classes, size of code blocks, imported Application Programming Interfaces, Application Programming Interface functions called, file size of components of the software application, and capabilities and access controls indicating the functions that the application wishes to be able to access.

In an alternative embodiment, the device comprises a database for storing data relating to the source from which the original, clean version of the software application was obtained and further metadata relating to the clean version of the software application.

According to a third aspect, there is provided a device for use in a communication network. The device is provided with a processor for determining that a software application in the form of at least one electronic file is suspicious. A transmitter is provided for sending a request message to a remote server, the request message including at least an identity of the source from which the suspicious software application was obtained. A receiver is also provided for receiving a response from the server, the response including an indication of whether the software application is likely to contain a Trojan horse, the likelihood having been determined at least by the server comparing the source from which the suspicious software application was obtained with an original, clean version of the software application was obtained and, in the event that the sources differ, determining that the suspicious application is likely to contain a Trojan horse.

According to a fourth aspect, there is provided a server for use in a communication network. The server is provided with a receiver for receiving from a remote device a request message, the request message including at least an identify of a source from which a suspicious software application in the form of at least one electronic file has been obtained. A processor is also provided for comparing the source from which the suspicious software application was obtained with a source from which an original, clean version of the software application was obtained. In the event that the sources differ, the processor optionally determines that the suspicious application is likely to contain a Trojan horse. A transmitter is provided for sending a response message, the response message including either the result of the comparison or an indication that the software application is likely to contain a Trojan.

The server optionally comprises a database for storing the source from which the original, clean version of the software application was obtained and further metadata relating to the clean version of the software application.

As an option, the sources comprise an identity of a vendor.

As a further option, the processor is arranged to make a comparison between the suspicious version of the software application and the clean version of the software application of any of the version numbers, version histories, application classes, size of code blocks, imported Application Programming Interfaces, Application Programming Interface functions called, file size of components of the software application, and capabilities and access controls indicating the functions that the application wishes to be able to access.

According to a fifth aspect, there is provided a computer program, comprising computer readable code which, when run on a device, causes the device to behave as a device as described in either of the second or third aspects.

According to a sixth aspect, there is provided a computer program product comprising a computer readable medium and a computer program as described in the fifth aspect, wherein the computer program is stored on the computer readable medium.

According to a seventh aspect, there is provided a computer program, comprising computer readable code which, when run on a server, causes the server to behave as a server as described in the fourth aspect.

According to an eighth aspect, there is provided a computer program product comprising a computer readable medium and a computer program as described in the seventh aspect, wherein the computer program is stored on the computer readable medium.

DETAILED DESCRIPTION

Figure 1:
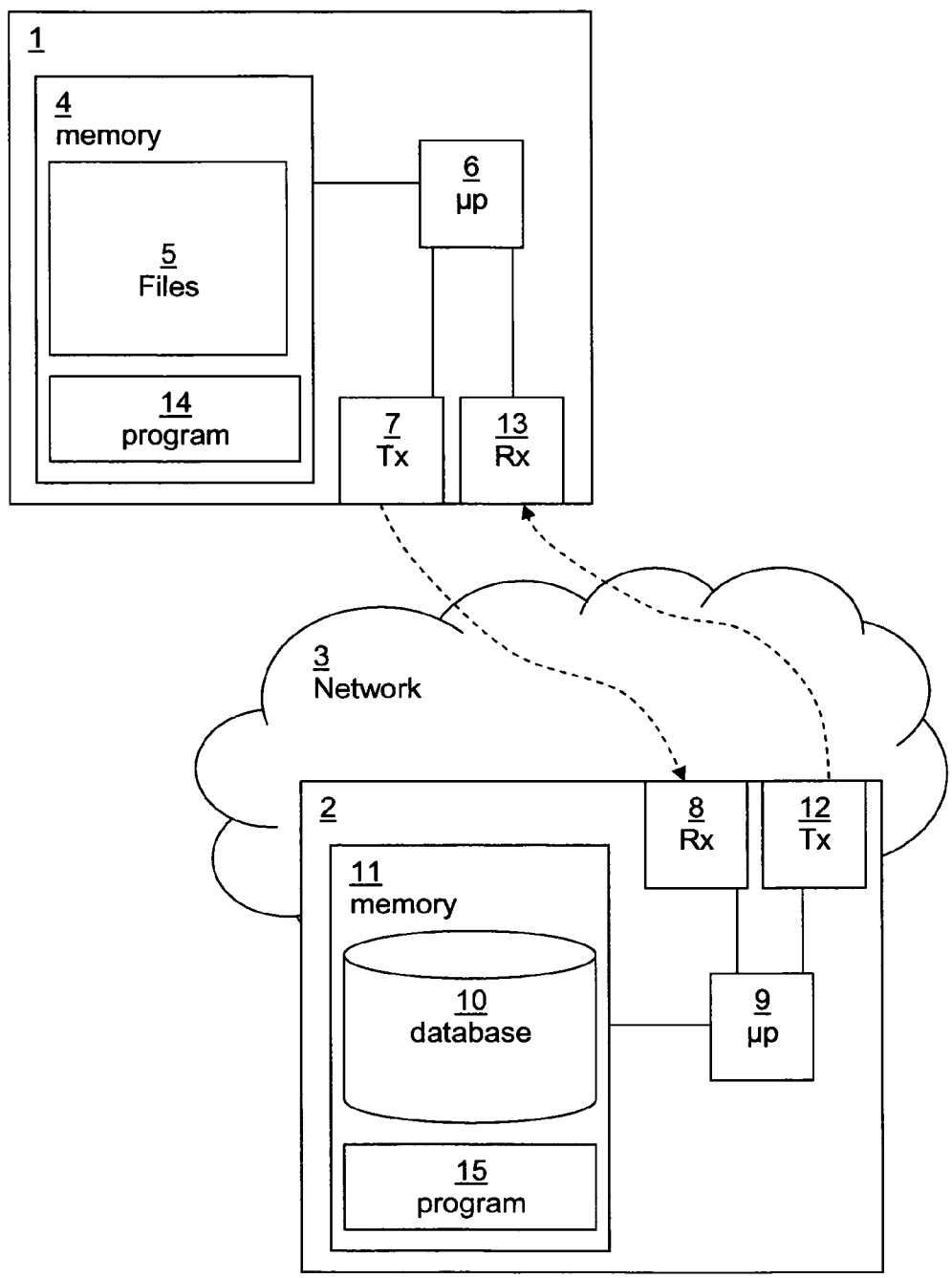
FIG. 1 illustrates schematically in a block diagram a network architecture according to an embodiment of the invention.

In order to detect whether a suspicious software application has been trojanized, the suspicious software application is compared with a known clean version of the software application. If the suspicious software application has been obtained from a different source than the known clean version of the software application, then this raises the probability that the suspicious software application has been trojanized and further tests can be made.

A provider of security services such as anti-virus software obtains known clean versions of software applications. This may be done by accepting submissions, for example from a trusted application store, or by crawling the Internet. Metadata is extracted from the known clean versions and this is stored in a database. Examples of metadata that may be stored include the following:

1. Source of the software application; in other words, the application store from which it has been obtained, the vendor providing the software application, or a URI of another type of website from which it has been obtained.

2. The software application name and an identity of a vendor from which the application was obtained. The identity may be a cryptographic signature or simply an identity value used by the vendor.

3. The software application version number.

4. The software application size.

5. A digital signature with which the software application has been signed.

6. A list of application classes, imported Application Programming Interfaces (APIs), API functions called, and/or size of code blocks.

7. A list of capabilities and access controls, which indicates the functions that the application wishes to be able to access.

8. A list of external properties of the application, such as image matching in a start-up screenshot, or image matching of application User Interface (UI) icon (if it is not an Operating System default).

9. Code similarity clustering, in other words an application having, say, 95% identical code with other applications in the same cluster (this can be done only by a backend server).

10. Installation location in the end user client. For example, in MICROSOFT WINDOWS, c:\program files\application name is unique and can be used to classify the software application. Similarly, SYMBIAN uses a similar model with c:\private\APPUID (for example c:\private\10002542b), which is the only place where application can store data files.

The detection of a Trojanized software application can be performed in the backend, where suspicious software applications that have been identified as being Trojan horses are automatically tagged as malware. Alternatively, an antivirus client application at the device which has obtained the suspicious application can collect the metadata of a suspicious application being scanned and can verify the information from a local database, from a cloud database, or can request a backend server to verify the metadata.

While detection of a Trojanized software application can take place in the backend, at a device, or at a on-line anti-virus server in communication with a device, the following example assumes that the detection occurs using a client device and an anti-virus server.

Referring to FIG. 1 herein, there is illustrated a device 1, which could be a personal computer, a mobile device, a Smartphone, or any other type of computer device. The device 1 can communicate with a remote server 2 located in a network 3.

The device 1 has a computer readable medium in the form of a memory 4, at which files 5 can be stored. A processor 6 identifies a suspicious software application. This may occur, for example, by scanning software applications stored in the memory 4, or prior to storing a software application in the memory 4, for example, when downloading the software application from an application store. The processor 6 determines where the software application originated, and collects some or all of the other above-described example metadata relating to the software application. A transmitter 7 sends a message to the server 2 that includes the metadata.

The server 2 is provided with a receiver 8 that receives the message from the device 1. A processor 9 is provided that analyzes the metadata contained in the message, and compares the metadata with metadata from a known clean version of the software application stored in a database 10 that is stored in a computer readable medium in the form of a memory 11. Note that the database 10 is shown as being located at the server 2, although it will be appreciated that the database 10 may be located at a further remote node that the server 2 can query.

The processor first compares the source of the suspicious software application (for example, the identity of an application store from which it was obtained or the vendor from which it was obtained) with the source of the equivalent clean software application stored in the database 10. If the sources are the same, then the suspicious software application is unlikely to have been trojanized, although other indicators described below may suggest that the software application has been trojanized. It is possible for an original, clean version of the software application to be available from an application store, and for a trojanized version of the software application to be available from the same store, although this is unlikely.

If the suspicious software application has been obtained from a different source than the clean version of the software application, then the probability that the suspicious software application has been trojanized is increased. A different source may be mean that different versions of the software application are available from different application stores, or may mean that different versions of the software application are available from different vendors from the same or different application stores. Further checks can be made. For example, the suspicious software application may include more functionality that is not included in the clean software application. This may include, for example, the ability to make telephone calls, access certain websites or send Short Message Service messages. If the clean version of the software application does not include this functionality but the suspicious version does, then it is very likely that the suspicious version has been trojanized.

The suspicious version of the software application may request more capabilities than the clean version of the software application, such as permissions for accessing certain types of file and so on. Again, this is strong evidence that the suspicious version of the software application has been trojanized.

A comparison of the digital signatures of the suspicious version of the software application and the clean version of the software application can be made. Even if the digital signature of the suspicious version of the software application is valid, if it differs from the digital signature of the clean version of the software application, it provides evidence that the suspicious version of the software application has been modified in some way. This increases the probability that the suspicious version of the software application has been trojanized.

A comparison can also be made of the functionality of the clean version of the software application and the suspicious version of the software application. For example, if the suspicious version of the software application has different functions to the clean version of the software application, or requires different resources, then the suspicious version of the software application has been modified in some way and is more likely to have been trojanized.

A further check may be to look for encryption routines used for obfuscation in the suspicious version of the software application, especially if these are not present in the clean version of the software application. Again, this is evidence that the suspicious version of the software application has been trojanized, as any malicious code introduced into the trojanized suspicious version of the software application is likely to use obfuscation techniques.

Other metadata, such as version number, version history and so on may also be compared. Any differences between the metadata of the clean version of the software application and the suspicious version of the software application provides evidence that the suspicious version of the software application has been modified in some way, and so it increases the probability that the suspicious version of the software application has been trojanized.

The database 10 may group applications based on their name, id, and version information. Applications may also be grouped by external properties, such as start-up screen image, image matching of application User Interface (UI) icon, or code similarity clustering as described above. Applications in the same group may be checked to ensure that the same versions of the clean software application and the suspicious software application are compared.

While a single change of the sort described above may not be suspicious enough alone, the detection of multiple changes is very suspicious when the suspicious version purports to be the same or an updated version of an existing software application.

Furthermore, the version history can be used to assist the detection of a trojanized software application. If some functionality appears in a particular version, but not in other (either earlier or later) versions of the same software application, this indicates that a malicious third party has trojanized the software application.

The memory 4 at the device 1 may also be used to store a computer program 14 which, when run by the processor 6, causes the device 1 to behave as described above. Similarly, the memory 11 at the server 2 may also be used to store a computer program 15 which, when run by the processor 9, causes the server 2 to behave as described above In order to populate the database 10, the server 2 may crawl the Internet to obtain clean versions (or metadata relating to clean versions) of software applications from trusted application stores. Alternatively, software developers may provide the server with clean copies of a software application (or metadata obtained from a clean copy of the software application)

Figure 2:
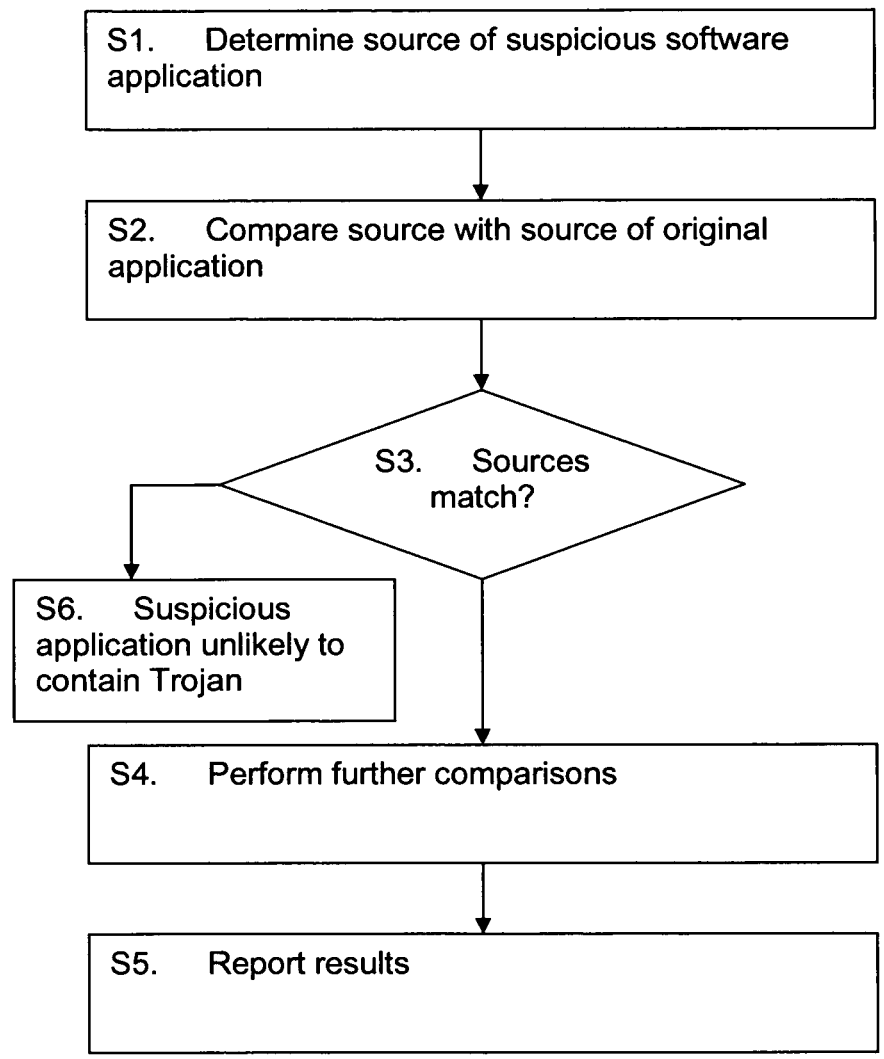
FIG. 2 is a flow diagram illustrating steps according to an embodiment of the invention.

In order to better describe the invention, FIG. 2 shows steps according to an embodiment of the invention. The following numbering corresponds to the numbering used in FIG. 2:

S1. A device that has a suspicious software application determines the source of the software application. Typically, this will be the application store from which the suspicious software was obtained.

S2. A comparison is made between the source of the suspicious software application and the source of the clean, original version of the same software application.

S3. If the sources match, then the process proceeds at step S6, otherwise the process proceeds at step S4.

S4. If the sources do not match, then further checks are performed, which could include any of the checks described above.

S5. The results of the further comparisons are reported to determine whether or not the suspicious software is likely to have been trojanized.

S6. If the sources match, then the suspicious software is unlikely to have been trojanized.

Figure 3:
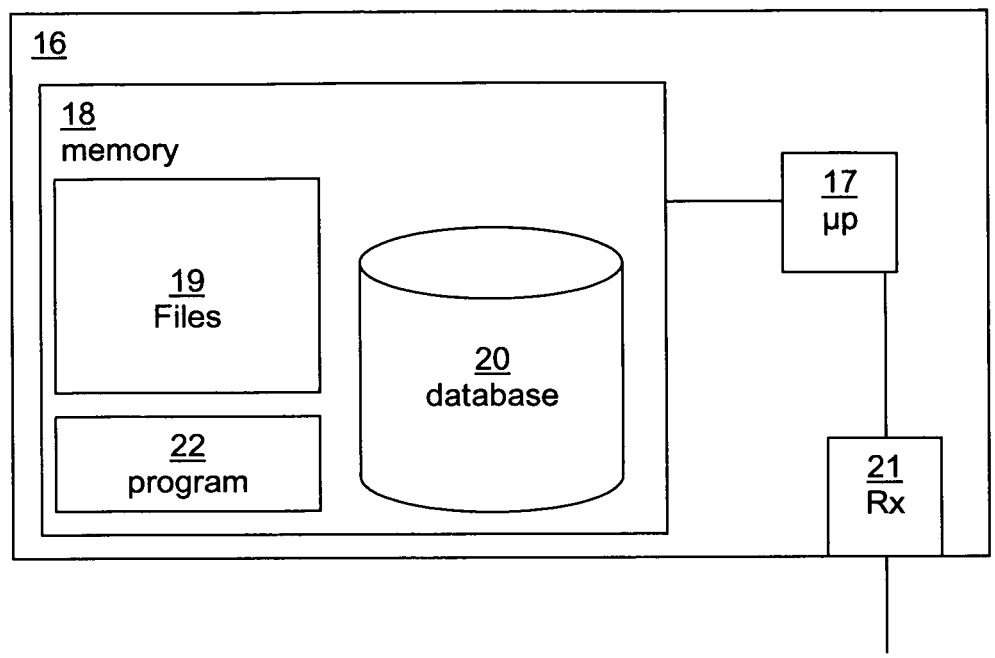
FIG. 3 illustrates schematically in a block diagram a device according to a further embodiment of the invention.

The above example describes an embodiment in which a device 1 sends information to a server 2, which performs the comparison between the sources of the applications. It will be appreciated that other architectures can be employed, an example of which may be found in FIG. 3.

A device 16 in this example comprises a processor 17 and a computer readable medium in the form of a memory 18. The memory 18 is used for storing files 19 and also a database 20 of known clean versions of software applications. A receiver 21 is provided that is used to download a software application from an application store. The processor 17 is arranged to make a comparison between the source of the downloaded software application and a clean version of the software application stored at the database 20. In this example, there is no need for the device to contact a remote server to determine whether or not the suspicious software application is likely to have been trojanized.

A computer program 22 may also be stored in the memory 18. When run by the processor 17, the program 22 is arranged to cause the device 16 to behave as described above.

Note that in an alternative embodiment, rather than the device 16 having the database 20 stored locally at the device, it may be able to query a backend server or a database in a distributed network to obtain the information required in order to make the comparison between the source of the suspicious software application and the source of the original, clean version of the application, and any other metadata comparisons.

To illustrate how the invention works, in late 2010 a software application called MonkeyJump2 was trojanized using Geinimi and distributed using a Chinese application store. The original software application, MonkeyJump2 had been distributed using a reputable application store based in the US.

Table 1 shows a comparison of data collected from the clean version of MonkeyJump2 and the trojanized version:

TABLE 1

Comparison of clean and trojanized versions of MonkeyJump2

| | Original | Trojan |
| --- | --- | --- |
| Source | Trusted, high volume application store in the US | A less known application store in China |
| Signer | Company A | Company B |
| Capabilities | Just a couple, normal ones | Extremely large list of privacy-invading capabilities |
| List of classes | N classes | N + 1 classes |
| Function calls | Normal game related | Cryptographic calls (DES functions) |

The prior art methods for detecting that the suspicious version of MonkeyJump2 had been trojanized rely of analysis of the code or emulation of the behaviour of the suspicious application. These are both resource intensive, time consuming, and can be unreliable. Using the present invention, on the other hand, a quick comparison of the source of the suspicious software application and the original version of the software application shows that the sources differ, raising the probability that the suspicious software application has been trojanized. Further analysis is therefore performed to determine the likelihood that the suspicious software application has been trojanized.

It can be seen that the two versions were signed by different companies, and that the trojanized version of the software application had capabilities that were not included in the original version. Furthermore, these additional capabilities were privacy-invading, which suggests that the suspicious version of the software application has been trojanized. In addition, the suspicious version of the software application used one more class that the original version, and also included function calls that were not included in the original. One of these additional function calls used cryptographic functions, which further supports the determination that the suspicious version of the software application had been trojanized.

The present invention greatly simplifies and speeds up the determination that a software application, in particular one obtained from an application store, has been trojanized, by comparing the source and other metadata from a suspicious software application with that of a clean original version of the same software application.

It will be appreciated by the person of skill in the art that various modifications may be made to the above described embodiment without departing from the scope of the present invention. In particular, the system architecture may vary, and a device can use information from a local server or a cloud database, or a backend server can compare the metadata relating to the suspicious software application.

The invention claimed is:

1. A method of detecting a Trojan horse in a suspicious version of a software application in the form of at least one electronic file, the method comprising:
    at a computer device, determining a source from which the suspicious version of the software application was obtained;
    comparing the source from which the suspicious version of the software application was obtained with a source associated with an identity of a vendor from which an original, clean version of the software application was obtained; and
    in the event that the sources differ, determining that the suspicious version of the software application is likely to contain a Trojan horse.

2. The method according to claim 1, further comprising making a comparison between the suspicious version of the software application and the original, clean version of the software application of any of version numbers, version histories, application classes, size of code blocks, imported Application Programming Interfaces, Application Programming Interface functions called, file size of components of the software application, and capabilities and access controls indicating Application Programming Interface functions that the software application wishes to be able to access.

3. The method according to claim 1, wherein the source from which the original, clean version of the software application was obtained and further metadata relating to the original, clean version of the software application is stored at a database.

4. The method according to claim 1, further comprising sending a message from a computer device to a remote server, the message including any of the suspicious version of the software application and metadata relating to the suspicious version of the software application such that the remote server can perform the comparison.

5. The method according to claim 4, further comprising at the computer device, receiving a response message from the remote server, the response message including an indication that the suspicious software application is likely to contain a Trojan horse.

6. The method according to claim 1, further comprising, at the computer device, sending a message to a remote database, the message including at least an identity of the suspicious software application; and
    receiving from the remote database a response, the response including the source from which the original, clean version of the software application was obtained.

7. A device for use in a communication network, the device comprising:
    a processor for determining that a version of a software application in the form of at least one electronic file is suspicious;
    the processor being further arranged to determine a source of the suspicious version of the software application;
    the processor being further arranged to compare the source from which the suspicious version of the software application was obtained with a source associated with an identity of a vendor from which an original, clean version of the software application was obtained and, in the event that the sources differ, determine that the suspicious version of the software application is likely to contain a Trojan horse.

8. The device according to claim 7, further comprising:
    a transmitter for sending to one of a server and a database a request message, the request message including a request for the source from which the original, clean version of the software application was obtained; and
    a receiver for receiving a response, the response including the source from which the original, clean version of the software application was obtained.

9. The device according to claim 7, wherein the processor is further arranged to make a comparison between the suspicious version of the software application and the original, clean version of the software application of any of version numbers, version histories, application classes, size of code blocks, imported Application Programming Interfaces, Application Programming Interface functions called, file size of components of the software application, and capabilities and access controls indicating Application Programming Interface functions that the software application wishes to be able to access.

10. The device according to claim 7, further comprising a database for storing data relating to the source from which the original, clean version of the software application was obtained and further metadata relating to the original, clean version of the software application.

11. A non-transitory computer readable medium comprising a computer program, the computer program comprising computer readable code which, when run on a device, causes the device to behave as a device as claimed in claim 7.

12. A non-transitory computer readable medium comprising a computer program product and a computer program according to claim 11, wherein the computer program is stored on the non-transitory computer readable medium.

13. A device for use in a communication network, the device comprising:
    a processor for determining that a version of a software application in the form of at least one electronic file is suspicious;
    a transmitter for sending a request message to a remote server, the request message including at least an identity of a source from which the suspicious version of the software application was obtained;
    a receiver for receiving a response from the remote server, the response including an indication of whether the suspicious version of the software application is likely to contain a Trojan horse, the likelihood having been determined at least by the remote server comparing the source from which the suspicious version of the software application was obtained with a source associated with an identity of a vendor from which an original, clean version of the software application was obtained and, in the event that the sources differ, determining that the suspicious version of the software application is likely to contain a Trojan horse.

14. A server for use in a communication network, the server comprising:
    a receiver for receiving from a remote device a request message, the request message including at least an identify of a source from which a suspicious version of a software application in the form of at least one electronic file has been obtained;
    a processor for comparing the source from which the suspicious version of the software application was obtained with a source associated with an identity of a vendor from which an original, clean version of the software application was obtained and, in the event that the sources differ, determining that the suspicious version of the software application is likely to contain a Trojan horse;

a transmitter for sending a response message, the response message including one of a result of the comparison and an indication that the suspicious version of the software application is likely to contain a Trojan horse.

15. The server according to claim 14, further comprising a database for storing the source from which the original, clean version of the software application was obtained and further metadata relating to the original, clean version of the software application.

16. The server according to claim 14, wherein the processor is further arranged to make a comparison between the suspicious version of the software application and the original, clean version of the software application of any of version numbers, version histories, application classes, size of code blocks, imported Application Programming Interfaces, Application Programming Interface functions called, file size of components of the software application, and capabilities and access controls indicating Application Programming Interface functions that the software application wishes to be able to access.

17. A non-transitory computer readable medium comprising a computer program, the computer program comprising computer readable code which, when run on a server, causes the server to behave as a server as claimed in claim 14.

18. A non-transitory computer readable medium comprising a computer program product comprising a computer program according to claim 17, wherein the computer program is stored on the non-transitory computer readable medium.

* * * * *